US005582518A

United States Patent [19]
Henique et al.

[11] Patent Number: 5,582,518
[45] Date of Patent: Dec. 10, 1996

[54] SYSTEM FOR RESTORING THE VISUAL ENVIRONMENT OF A PILOT IN A SIMULATOR

[75] Inventors: Michel Henique, Berville; Jean-Marie Malterre, Pelissanne, both of France

[73] Assignees: Thomson-CSF, Puteaux; Etat Francais, Paris, both of France

[21] Appl. No.: 391,463

[22] Filed: Feb. 21, 1995

Related U.S. Application Data

[63] Continuation of Ser. No. 178,614, Jan. 7, 1994, abandoned, which is a continuation of Ser. No. 991,709, Dec. 16, 1992, abandoned, which is a continuation of Ser. No. 402,522, Sep. 5, 1989, abandoned.

[30] Foreign Application Priority Data

Sep. 9, 1988 [FR] France .................................. 88 11821

[51] Int. Cl.$^6$ .............................. G09B 9/08; G09B 19/16
[52] U.S. Cl. .................................. 434/44; 434/38; 345/7; 348/123; 353/30
[58] Field of Search ............................ 434/37, 38, 40, 434/43, 44, 47, 57, 21, 247, 307; 212/1 C, 31 A, 31 B; 213/10, DIG. 28, 85 G, 10; 345/7; 348/123; 353/30

[56] References Cited

U.S. PATENT DOCUMENTS

| 3,309,795 | 7/1961 | Helmore | 434/59 |
|---|---|---|---|
| 3,560,644 | 2/1971 | Petricelli | 358/104 |
| 3,564,134 | 2/1971 | Rue et al. | 358/87 |
| 3,732,630 | 5/1973 | Grosbie et al. | 434/40 |
| 3,904,289 | 9/1975 | Yager | 434/44 |
| 3,998,532 | 12/1976 | Dykes | 434/40 |
| 4,093,347 | 6/1978 | La Russ | 434/44 |
| 4,348,186 | 9/1982 | Harvey et al. | 434/44 |
| 4,514,347 | 4/1985 | Reed | 434/40 |
| 4,538,991 | 9/1985 | Simpson et al. | 434/21 |
| 4,599,645 | 8/1986 | Brown et al. | 434/43 |
| 4,828,500 | 5/1989 | Seidel et al. | 434/247 |
| 4,962,420 | 10/1990 | Judenich | 358/104 |

FOREIGN PATENT DOCUMENTS

| 2438308 | 4/1980 | France . |
| 2091193 | 7/1982 | United Kingdom . |

OTHER PUBLICATIONS

Verber, "Present and potential Capabilities of Three–Dimensional Display using sequential excitation of Fluoroscence", 1977 pp. 62–67.

Primary Examiner—Richard Hjerpe
Assistant Examiner—Regina Liang
Attorney, Agent, or Firm—Oblon, Spivak, McClelland, Maier & Neustadt, P.C.

[57] ABSTRACT

The disclosed system essentially comprises a small diameter sphere, forming a projection screen, in which the pilot is placed. This sphere is associated with external and internal generators.

25 Claims, 8 Drawing Sheets

SYSTEM FOR RESTORING THE VISUAL ENVIRONMENT OF A PILOT IN A SIMULATOR

This application is a continuation of application Ser. No. 08/178,614, filed on Jan. 7, 1994, now abandoned which is a continuation of application Ser. No. 07/991,709, filed on Dec. 16, 1992, now abandoned which is a continuation of application Ser. No. 07/402,522, filed on Sep. 5, 1989, now abandoned.

BACKGROUND OF THE INVENTION

1. Field of the Invention

The present invention pertains to a system for restoring the visual environment of a pilot in an simulator.

The visual environment of a pilot includes the following main images:

moving images of the scene outside, normally seen in flight by the pilot through his cockpit canopy, comprising the sky, ground and moving objects such as aircraft, aerial and land targets, missiles, effects due to firing, etc.;

moving images from the fixed sight unit and the movable sight unit (headset sight unit);

moving images from the different instruments located chiefly on the instrument panel inside the cabin.

2. Description of the Prior Art

There are two types of prior art simulators used to restore an environment of this type: "spherical simulators" and "standard trainer" type simulators.

A "spherical simulator" has a sphere with a diameter of 8 to 12 meters (FIG. 2), the internal surface of which forms a wide-angled, concave, reflecting screen 20. A reproduction of the aircraft or helicopter cockpit 21, in which the pilot is placed, is located at the center of the sphere.

Figure 2:
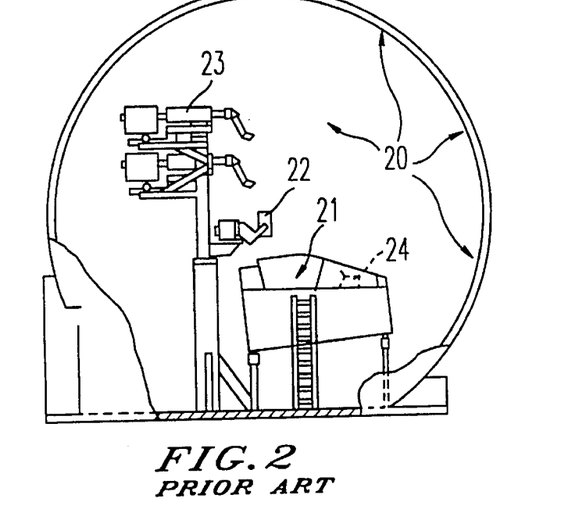
FIGS. 2 to 4, which have also been already mentioned, are schematic view of prior art simulators.

The view of the ground, and that of the sky, are simulated, for example by two images projected on the sphere and produced by a projection device 22, placed above the cockput and comprising two "fish-eye" type lenses oriented in opposition and located on either side of the center of the sphere The rolling and pitching effects are obtained by the rotation of the two fish-eyes around the center of the sphere.

The images of the moving objects are obtained by projection systems 22 placed above and behind the cockpit.

The image of the fixed sight unit is presented by an optical device 24 installed in the cockpit.

Figures 3A, 3B, 3C:
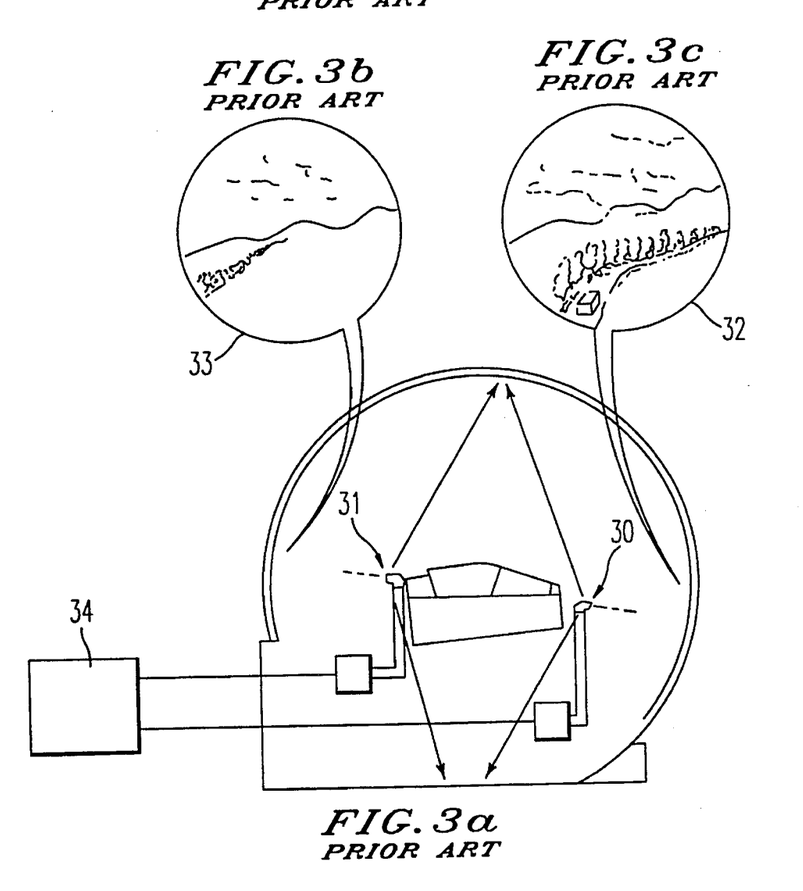

A variant (FIG. 3) of this spherical simulator uses two fixed fish-eye lenses 30 and 31, placed on either side of the cockpit, outside the pilot's range of vision. These two fish-eyes project two juxtaposed images 32 and 33 on the screen. These images 32 and 33 come from two light valve TV projectors connected to a synthetic image computer 34 generating the sky and the ground, located before and behind the cockpit, in taking into account the effects due to changes in altitude and position of the simulated aircraft.

Figure 1:
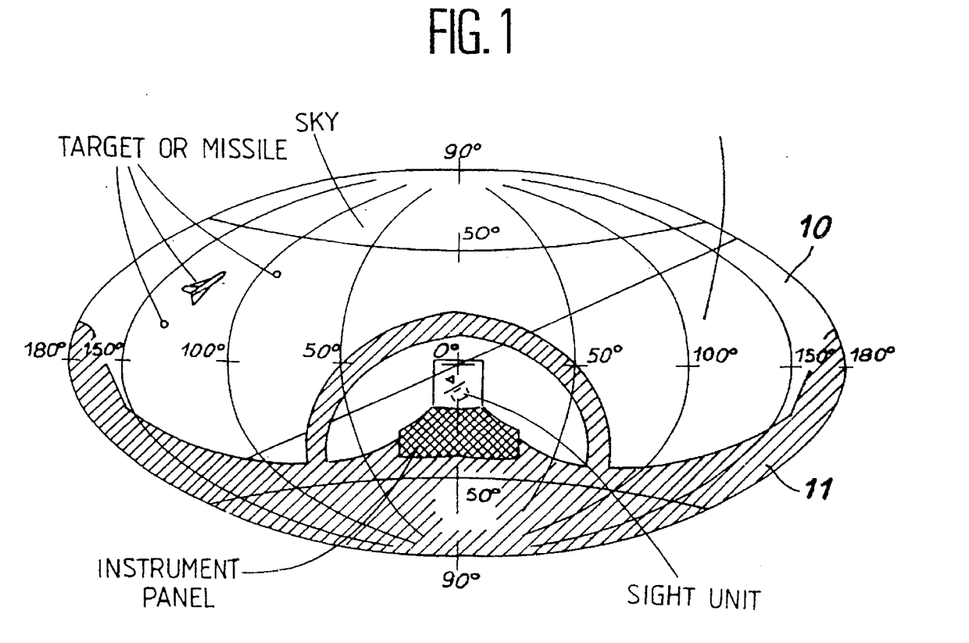
FIG. 1, already mentioned, is a schematic depiction of a pilot's field of vision.

The spherical simulator and its previously described variant present all the images of the scene outside, the fixed sight unit, the instrument panel etc., while respecting, as in reality, the apparent size and the relative position of each of the elements of these images with respect to the cabin and to the usual references of the pilot, and while respecting the field of vision illustrated by FIG. 1.

A simulator such as this works very well, but is very expensive.

Figure 4A:
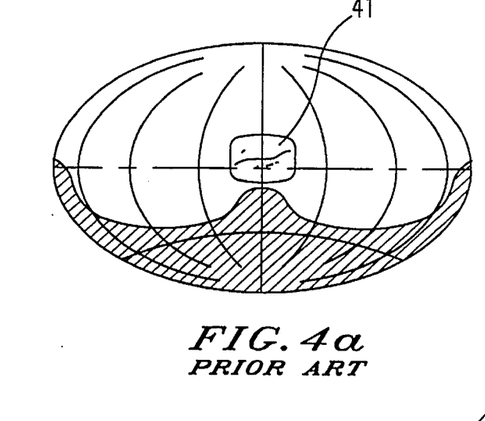
Figure 4B:
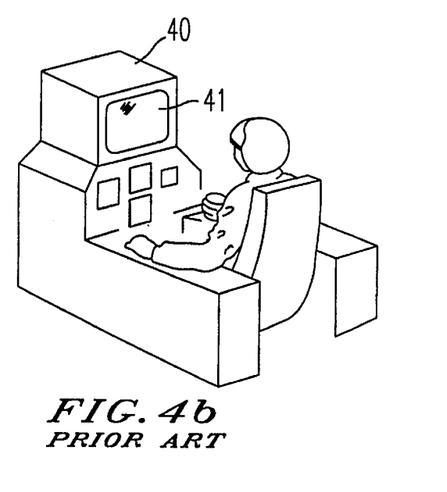

The second device, of the "standard trainer" type (FIG. 4), restores the pilot's environment by using sub-units such as a television screen 40 or a projector of a standard type found in the market presenting, in particular, the images of the scene outside 41 on a plane screen without respecting, unlike the spherical simulator, the apparent size and relative position of each of the elements of the outside scene with respect to the cockpit and to the pilot's references.

Thus, the image of the frontal outside scene which, in reality, covers a solid angle of $2\pi$ steradians, is presented by means of the plane screen beneath a solid angle 41, smaller than 0.5 steradian, depriving the pilot, notably in his peripheral field of vision, of the references needed to carry out a mission.

This second type of simulator costs little but is not satisfactory from the viewpoint of the realism with which the visual environment is restored.

An object of the present invention is a system to restore the visual environment of pilot in a simulator, a system that costs little, is easy to reconfigure and restores a visual environment that is as realistic as possible, in meeting the following constraints:

keeping to the apparent size and relative position of each of the elements of these images with respect to the cockpit and to the usual references of the pilot such as the fuselage horizontal reference (FHR) axis and the sight unit image reference axis etc., keeping to the dimensions of the field of vision that the pilot can explore in turning his head as in reality. The limits Of this field of vision are illustrated in FIG. 1 which is an example defining the boundary between the zone 10 observed through the cockpit and the zone 11, hidden by the cockpit including the instrument panel.

SUMMARY OF THE INVENTION

The visual environment restoring system according to the invention has an at least approximately spherical wall with dimensions of the same magnitude as those of a real aircraft cockpit, made of a material that is at least partially translucid, at least one part of at least its internal face being treated so as to form an image projection screen, this wall being associated with at least one internal image projector and at least one external image projector. Preferably, the spherical sphere has a diameter ranging between 1 and 3 meters approximately. Its thickness is about 2 to 10 mm.

BRIEF DESCRIPTION OF THE DRAWINGS

The present invention will be understood from the detailed description of several embodiments, taken as non-restrictive examples and illustrated by the appended drawings, of which.

DESCRIPTION OF PREFERRED EMBODIMENTS

An image projection sphere has been described here below, but it is clear that it is possible to have a half sphere or even a substantially spherical wall, for example, a wall formed by a great number of juxtaposed, small plane facets.

Figure 5:
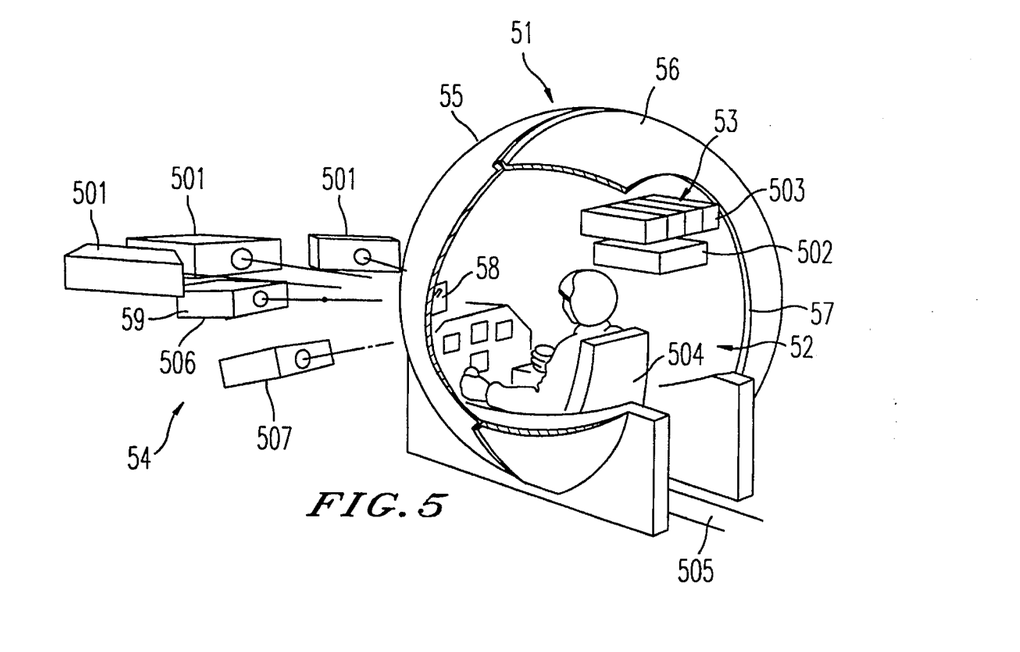
FIG. 5 is a schematic view of a system according to the invention.

The system of the invention essentially has a small diameter (of about one to three meters) sphere-screen 51. This sphere 51 is associated with a simulated aircraft (helicopter or airplane) cockpit 52 and internal projection devices 53 and external projection devices 54. This system enables the display of the frontal scene on a field greater than or equal to 2 n steradians, as shown in FIG. 1.

According to an advantageous embodiment, the sphere-screen 51 is made with two front and rear transparent half-spheres 55, 56, fabricated separately by hot blowing, with two plane plastic plates made of "Altuglass" type plastic material, and then assembled by cold bonding to form a complete sphere in which an aperture 57 is made, enabling the pilot to be take position.

The sphere 51, or at least the forward half-sphere 55, is treated on its inner and outer faces so as to enable the projection, thereon, of the images of the visual environment using the projection devices 53 and 54. The screen thus obtained works simultaneously in direct projection mode for the projectors 53 and in back projection mode for the projectors 54.

All the images coming from the projectors 53 and 54 are displayed on one of the faces of the sphere 51, advantageously on the internal face. Thus, in certain zones of this internal face, for example in the sight unit zone 58, four different images can be superimposed: the images of the sight unit produced by an external projector 59, the images of the landscape coming from the external projectors 501 (the number of which is, for example, three as shown in FIG. 5), the images of the sky coming from an internal projector 502, and the images of targets coming from an internal projector 503.

The optical characteristics of at least a part of the sphere-screen can be modified, either by causing variation in the characteristics of the coating layers deposited on at least one of the two internal and external faces of the sphere, or by frosting one of the two faces. The coating layers may be layers of paint, and their thickness and/or their color may be made to vary. In the simplest case, white paint is used. It is also possible to use coats of paint and frosting. In this case, the layers of paint can be deposited on one face, and the frosting can be done on the other face, or else layers of paint can be deposited on the frost.

This treatment of the surfaces of the sphere by layers of paint and/or frosting enables the system to be adapted to the luminous power of the projectors used. A very thick coating of paint deposited on the internal surface of the sphere enables a high albedo (optical efficiency of the screen) to be obtained for the images projected from inside the sphere, and a lower albedo for images projected from outside the sphere.

According to an advantageous characteristic of the invention, the sphere-screen is made in using a plastic material that is slightly tinted in the mass so that, during operation in back projection mode, the very many reflections that occur, inside the plastic material of the screen, on the plastic material/air interface, are attenuated. These reflections cause a halo to appear around the points of the image produced on the internal face of the sphere. The use of a tinted material makes it possible to increase the contrast of the images produced by back projection, notably of the images of the fixed sight unit.

According to one embodiment of the invention, one or more zones of the spherical screen, for example the zone where the image of the fixed sight unit is projected, may be replaced by plane screens, so as to simplify the external projection optical devices 54, which may then be standard projectors found in the market. These flat screens can be made with the same material as that of the sphere or with a different material. They can be fixed, for example by bonding, to the sphere, or else they can be fixed between the sphere and the pilot.

The cockpit 52 or, more precisely, the pilot's seat 504, is placed in the sphere 51 so that the pilot's eye is close to the center of the sphere-screen, at a distance of less than about 40 cm. from this center.

So as to make it easier for the pilot to enter the sphere, the system is fitted out with a movable seat 504 on rails 505, penetrating the sphere from its exterior to its interior. The pilots sits on the seat 504, outside the sphere. As soon as he is seated, if necessary strapped in, a motor (not shown) shifts the seat 504 on rails 505 up to the right position (that is, as stated above, the position in which the pilot's eye is as close as possible to the center of the sphere). For this position, the motion of the seat 504 is locked. Of course, the seat 504 has means (not shown) for adjustment in height and in inclination.

Figure 6:
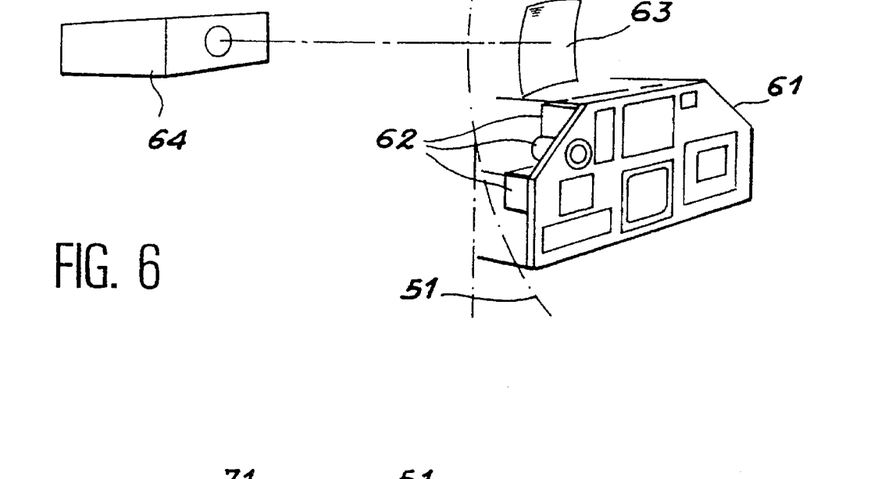
FIGS. 6 to 8 are schematic views of three embodiments of the instrument panel of the system of FIG. 5, and FIGS. 9 to 12 are block diagrams of different embodiments of the internal projection device of the system of FIG. 5.

As shown in FIG. 6, the instrument panel 61 of the system of the invention may have real instruments 62. The instrument panel 61 is surmounted by the sight unit image 63 which, as specified above, may be formed either on the sphere itself or on a plane screen fixed on the sphere or, finally, on a plane screen fixed in a position that is closer to the pilot's eye than the sphere is. The sight unit image is obtained through an external projector, respectively marked 506, 64, 71, 81 in FIGS. 5, 6, 7 and 8.

Figure 7:
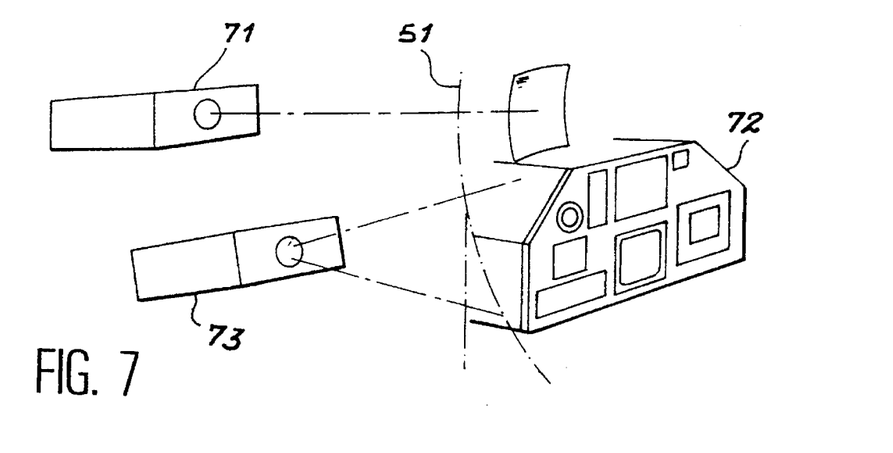

As shown in FIG. 7, the moving image 72 of all the instruments of the instrument panel may be projected on the sphere or on a plane screen (fixed to the sphere or in front of it) through an external projector 73 (marked 507 in FIG. 5).

Figure 8:
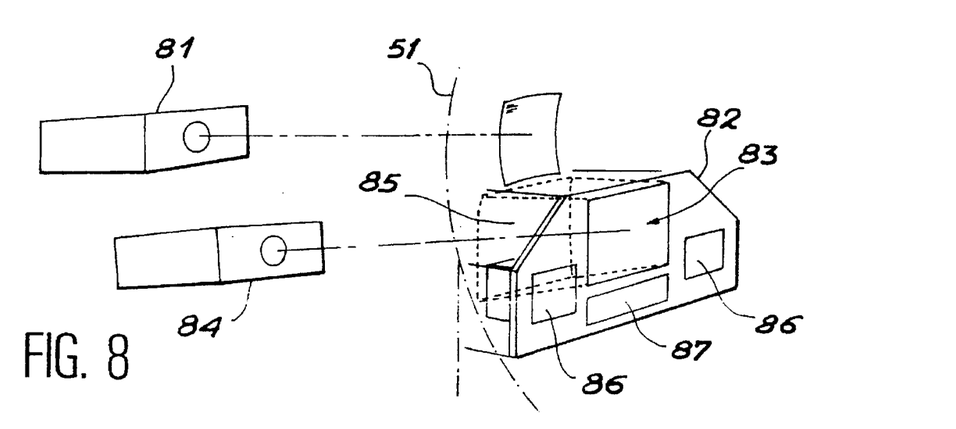

Finally, as shown in FIG. 8, the system may have an instrument panel 82 in which a cut-out feature 83 is made, enabling the pilot to see the projection, made by an external projector 84, placed beneath the projector 81, of an image 85 with head at medium level. The instrument panel 82 is fitted out with real instruments 86, and with a control box 87.

Figures 9A, 9B, 9C:
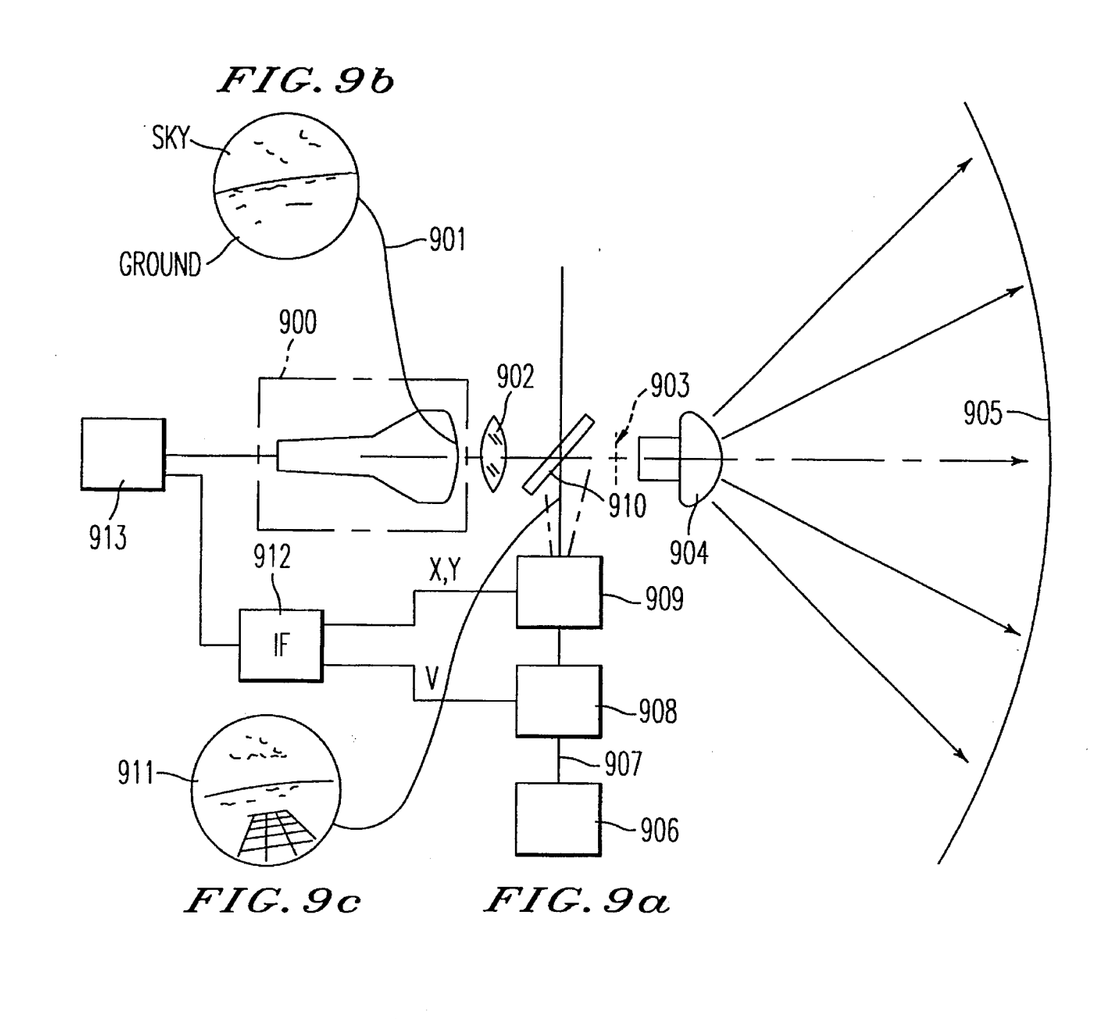

According to a preferred embodiment of the invention, the set of internal projectors 502, enabling the image of the ground and of the sky to be projected on to the sphere-screen, have a high brilliance tube projector and a laser source projector associated with one and the same projection fish-eye lens. The details of their structure are shown in FIG. 9.

The high brilliance cathode-ray tube 900 forms an image 901 of the sky (bright zone) and of the ground (dark zone) on its front face. This image 901 is traced in television mode, in accordance with any of the existing standards (for example, with 625, 875 or 1024 lines).

A lens-using optical device 902 forms the image of the front face of the cathode-ray tube in the focal plane 903 of a fish-eye lens 904 which projects this image on the internal face of the spherical screen 905 (the sphere 51 of FIG. 5) so as to cover at least half of this screen, namely 2π steradians.

The laser projector has a laser generator 906 that emits a visible beam 907, modulated in intensity by a transducer, for example a piezoelectric transducer, with optical crystal, which is a modulator, referenced 908.

A deflecting device 909, using two galvanometrical mirrors, deflects the laser beam in calligraphic mode on a field extending, for example, over ±4.5° in elevation and ±4.5° in relative bearing.

The laser beam that is thus deflected is reflected by a semi-reflecting strip 910, placed between the optical device 902 and the lens 904, towards this lens 904. The lens 904 plays the role of a scanning amplifier with respect to this laser beam, and converts the ±4.5° deflection into a deflection ranging from ±90° to ±110° depending on the type of fish-eye used.

The laser beam forms an image 911 on the spherical screen 905. This image 911 consists of several vectors representing the horizon line and a grid on the ground.

An electronic interface 912 enables the preparation, in real time, of the analog signals X, Y and video signals for the control of the devices 909 and 908 respectively.

The above-mentioned images 901 and 911, superimposed on the screen 905, are produced by a digital computer 913 which generates these two images in taking into account the optical relationship of the fish-eye 904 with respect to the spherical screen in order to produce, on this screen, images having the least possible distortion with respect to what the pilot is likely to see. For certain applications, the superimposition of these two images makes it possible to present a horizon line that is brighter, shows greater contrast and is precisely positioned, whereas the horizon line produced by the tube 900 alone is less luminous and shows less contrast because of the size of the screen surface to be illuminated and because of the integrating spherical screen phenomenon which destroys the overall contrast of the image.

According to a simplified variant, not shown, only the high brilliance tube projector 900 is used, with its optical devices 902 and 904 and the computer 913.

Figure 10:
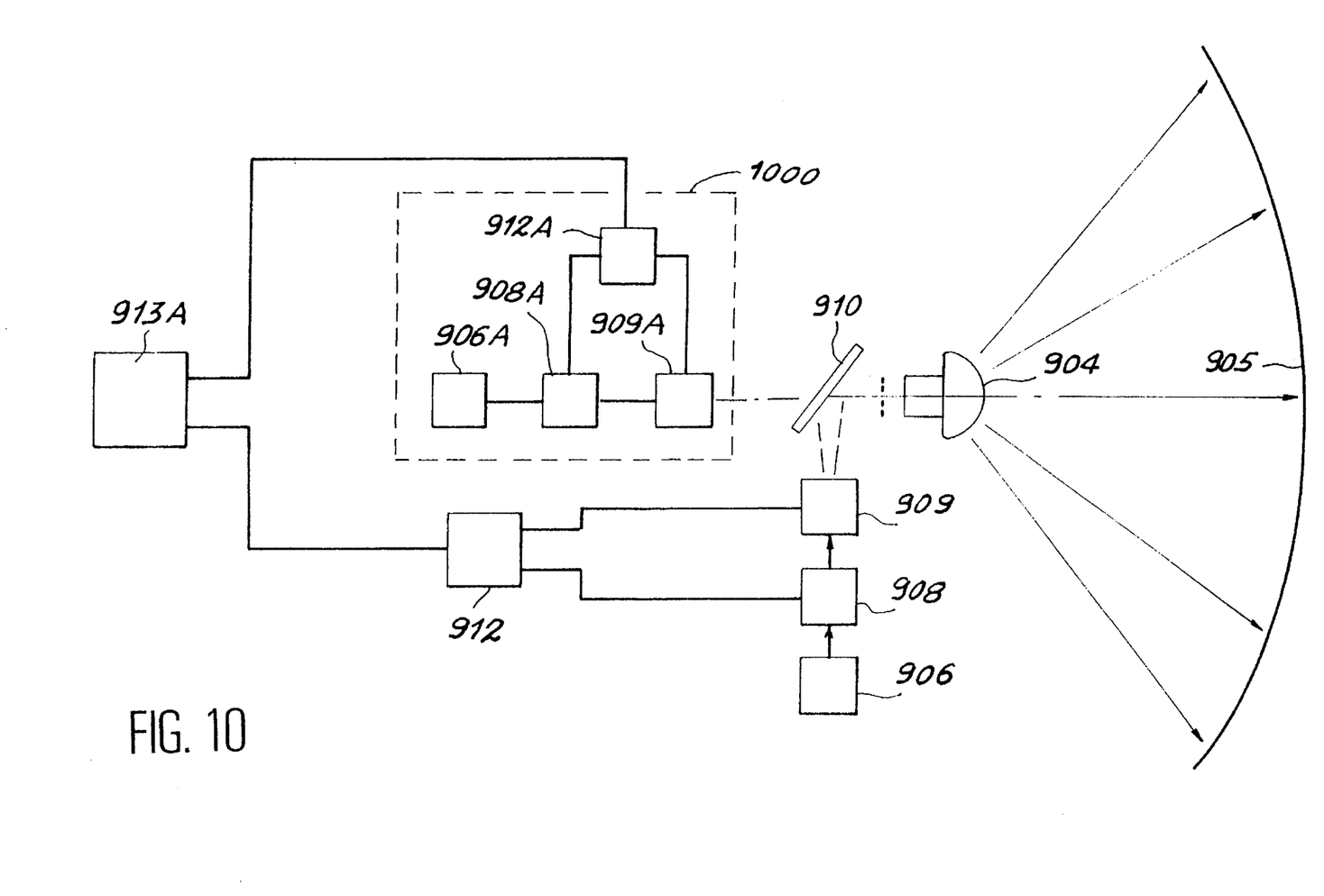

According to another variant, shown in FIG. 10, the high brilliance tube is replaced by a projector with laser generator working in television scanning mode in order to trace an image formed, for example, by two interlaced frames of 128 lines each, to represent the sky (bright zone) and the ground (dark zone). This system has, in addition to the devices 904, 905, 906, 908, 909, 910 and 912, which are identical to those of FIG. 9, the unit 1000 formed by the devices 906A, 908A, 909A and 912A, respectively identical to the devices 906, 908, 909 and 912. The computer 913A is similar to the computer 913, but is designed, to also control the unit 1000.

The divergence of the laser beam, projected by the unit 1000 towards the fish-eye lens 904 through the semi-transparent mirror 910, is adjusted so that the diameter of the laser spot projected on the screen 905 covers two or three scanning lines so that the television frame is not made to appear on the screen.

Figure 11:
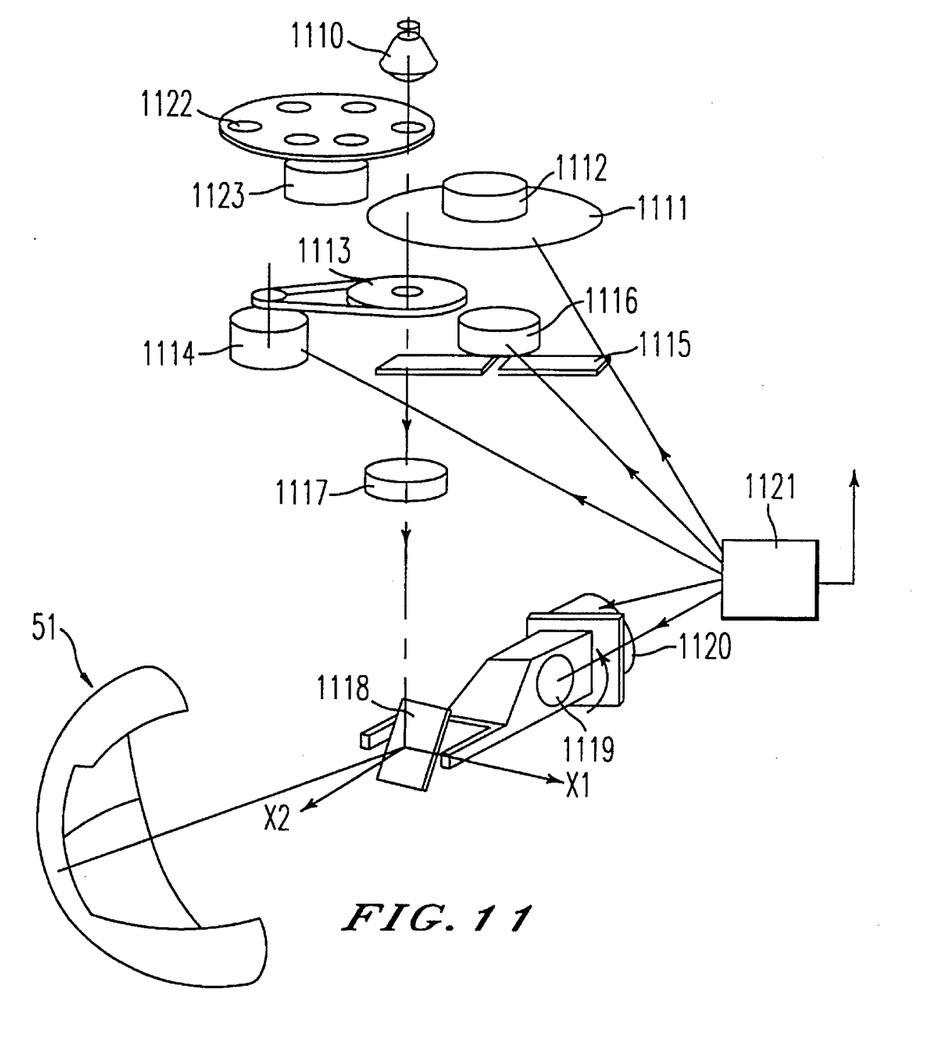

FIG. 11 shows a simplified diagram of a device implanted in the sphere-screen near the projectors, to project simplified images of targets, taking the form of several, independent, movable spots, having variable diameters as a function of the distance of each target from the pilot.

For each target image projected, this device has a light source 1110, an attenuator disc 1111 controlled in rotation by a stepping motor 1112 in order to control the luminosity of the projected spot, a variable diaphragm 1113 controlled by a stepping motor 1114 controlling the diameter of the projected spot, a shutter 1115 controlled in rotation by a stepping motor 1116 in order to conceal the spot permanently or according to a variable frequency or intermittently (flashing), a projection lens 1117 forming the image of the diaphragm 1113 on the spherical screen 51, a mirror 1118 that is rotationally movable on two rectangular axes X1, X2 and is controlled by the stepping motors 1119 and 1120 respectively for each of these axes, in order to move the spot on the spherical screen 51, and a stepping motor 1123 associated with a disk 1122 comprising several windows fitted out with colored filters in order to choose the color of the projected spot. The stepping motors are all controlled by an electronic computer 1121 providing for the links with the main electronic computer (not shown) of the system, the initializing of the stepping motors in zero position when the system is energized and the preparation of micro-steps for the control of the motors 1119, 1120 to position the mirror 1118 with a resolution in the region of one arc minute.

Figure 12:
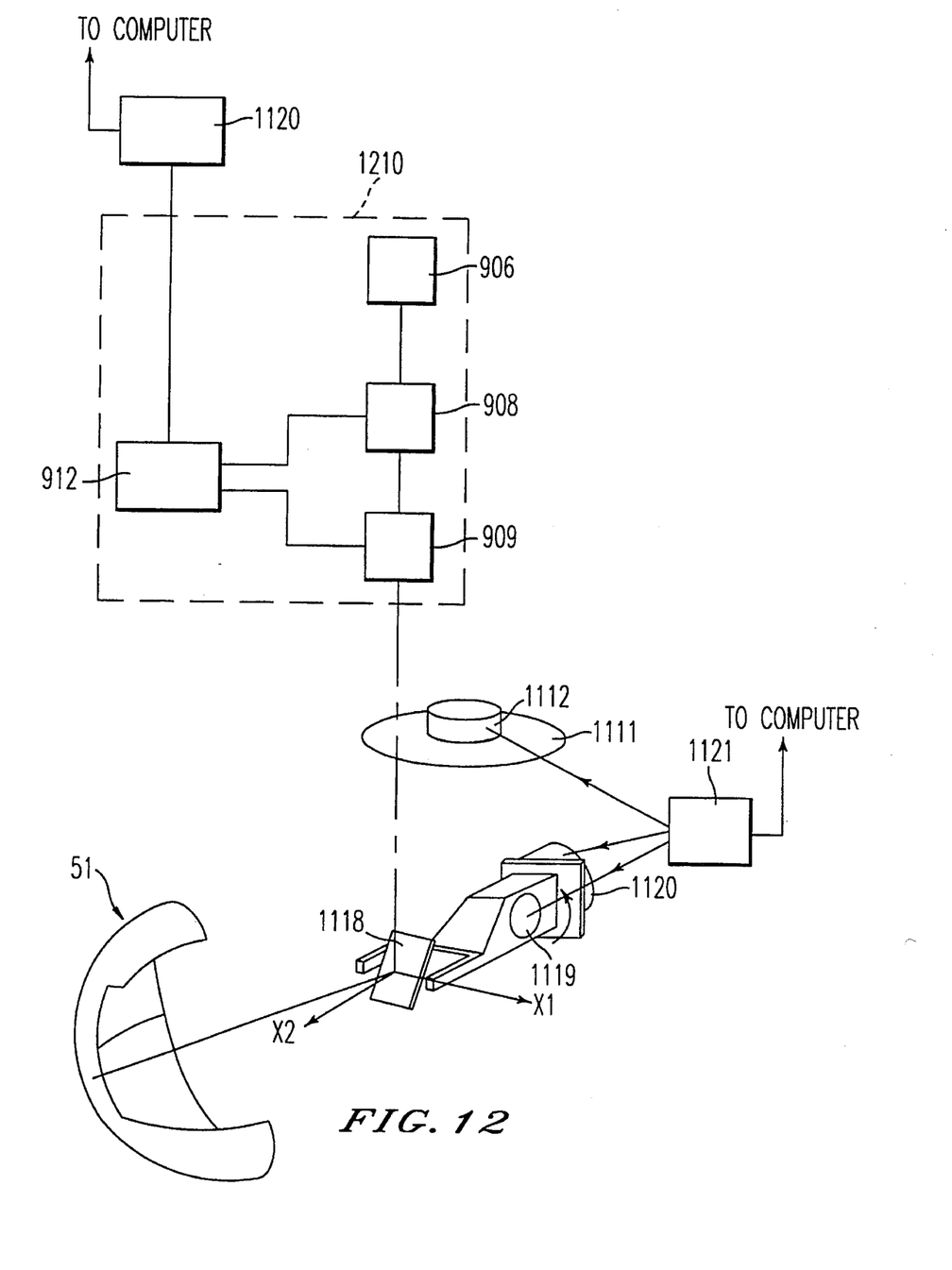

According to a variant of the device of FIG. 11, shown in FIG. 12, the spot is replaced by a monochromatic image or a black and white image with 256 lines for example, obtained by scanning and modulation of one or two laser beams.

In this device of FIG. 12, the elements 1111, 1112 and 1118, 1121 are respectively identical to those elements bearing the same reference in FIG. 11. The other elements of FIG. 11 are replaced by a set 1210 having the elements 906, 908, 909 and 912 which are respectively identical to the elements, with the same reference, of FIG. 9. The interface 912 is controlled by a computer 1220, similar to the computer 913 of FIG. 9, and this computer 1220 is connected to the central computer of the system. The computer 1220 produces a television image that takes into account the effects of rotation of the images induced by the movable mirror 1118, of the attitude of the target in flight, of its distance and of its position with respect to the observer.

What is claimed is:

1. A system for projecting visual information to a simulator pilot comprising:

a simulated cockpit of a sufficient size to allow at least one individual to sit therein;

an approximately spherical wall having an inside and an outside surface made of a translucent material and having at least one surface treated so as to provide a projection surface and having a size approximately that of a real cockpit and which encloses at least an area in front of said simulated cockpit such that said wall is in the field view of said individual sitting therein;

a plurality of standard internal projectors contained within said cockpit for directly projecting images on the inside of said spherical wall in the field of view and directly without additional optical element intervention on the translucent material of said spherical wall of said individual wherein at least one of said projectors is a fish eye moveable projector for projecting of ground/sky images and at least one projector of target images; and at least two external projectors placed external to said cockpit for projecting images directly on the outside of said spherical wall such that said images, projected by said external projectors on the outside of said translucent spherical wall, are superimposed on said images projected on the inside of said translucent spherical wall by said internal projectors so as to create a composite image wherein said at least two external fixed projectors comprises at least one projector of the landscape, and at least one projector of a sight unit.

2. A system according to claim 1, wherein said spherical wall has a diameter measured from the eyes of said individual to said wall ranging from about 1 to 3 meters.

3. A system according to claim 1 or 2, characterized in that the thickness of the wall is about 2 to 10 mm.

4. A system according to claim 1, wherein said spherical wall, comprises:

two semi-spheres fabricated separately by hot blowing with two plane plates made of plastic material and then assembled so as to form said approximately spherical wall such that an aperture is made therein, enabling the pilot to take a position therein.

5. A system according to claim 1, wherein the surface of the inside wall is treated by the deposition of coating layers.

6. A system according to claim 5, wherein the coating layers are layers of paint.

7. A system according to claim 6, wherein the paint is white paint.

8. A system according to claim 5, wherein the thickness of the coating is made to vary.

9. A system according to claim 1, wherein said wall having at least one surface treated is a treatment enabling a frosting to be obtained.

10. A system according to claim 1, wherein the wall is made of plastic material tinted in the mass.

11. A system according to claim 1, wherein at least one zone of said spherical wall is formed by a planar screen section.

12. A system according to claim 11, wherein the planar screen section is fixed to a portion of said spherical wall.

13. A system according to claim 11, wherein said planar screen section is fixed between said spherical wall and said individual.

14. A system according to claim 1, with a cockpit placed inside the wall and having a seat for the pilot, wherein the seat is arranged so that the pilot's eye is close to the center of the sphere formed by the wall, at a distance from this center which is smaller than about 40 cm.

15. A system according to claim 14, wherein the seat is movable on rails and adjustable in height and in inclination.

16. A system according to claim 1, comprising an instrument panel having real instruments.

17. A system according to claim 16, wherein at least one part of the instrument panel forms a screen to at least one external projector.

18. A system according to claim 1, wherein said fish-eye projector, projecting the moving image of the sky and the ground, has a high brilliance cathode-ray tube projector.

19. A system according to claim 1, wherein said fish-eye projector, projecting the moving image of the sky and the ground, has a projector with laser generator, working in television scanning mode.

20. A system according to claim 18, wherein at least one of the internal images projectors further has a second projector with laser generator, modulator and deflection device.

21. A system according to claim 20, wherein the laser generator does a tracing in calligraphic scanning mode.

22. A system according to claim 20, wherein the projector with laser generator traces a horizon line on the projection wall and a movable grid on the ground.

23. A system according to claim 1, further comprising means for generating images of targets by way of movable spots having variable diameters that can be at least partially concealed.

24. A system according to claim 23, wherein the spots can be concealed according to a variable frequency.

25. A system according to claim 1, wherein the images of the targets are produced by a projector with laser generator.

* * * * *